United States Patent Office 2,956,268
Patented Oct. 11, 1960

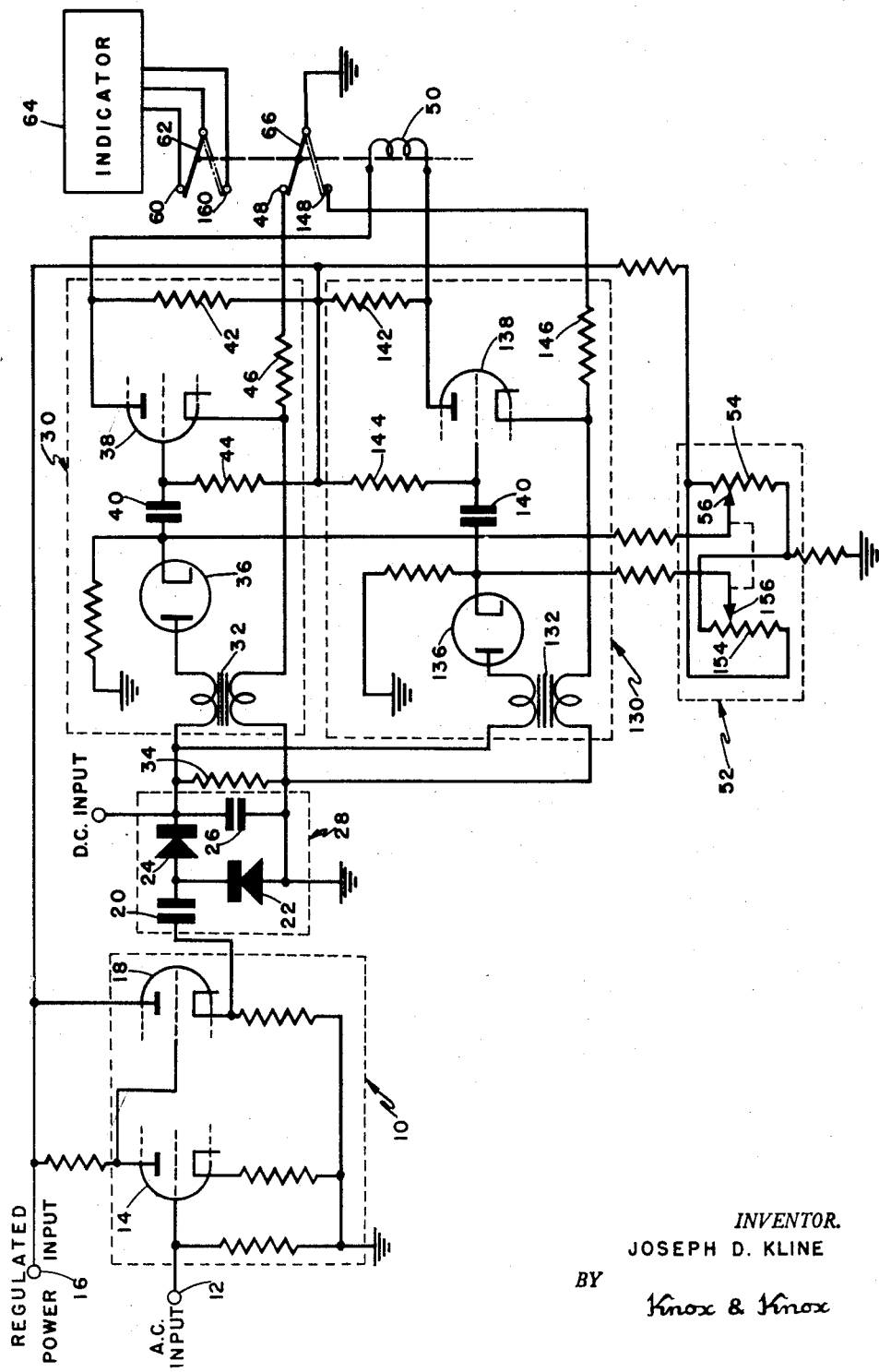

2,956,268
VOLTAGE DEVIATION DETECTOR

Joseph D. Kline, San Diego, Calif., assignor to Ryan Aeronautical Co., San Diego, Calif.

Filed Apr. 28, 1958, Ser. No. 731,191

2 Claims. (Cl. 340—248)

The present invention relates to a voltage deviation detector for indicating, controlling or otherwise responding to a variation in voltage above or below preset limits.

Many types of voltage controlling and deviation indicating devices have been designed, but the majority of these use a meter or similar instrument to show voltage change. Meters are subject to restrictions in range according to the accuracy required and are difficult to read accurately, although some have been constructed with internal contacts to make or break circuits at preset points. This type of instrument is not readily adjustable to cover different ranges. The deviation detector described herein is extremely accurate within close tolerances, is fully adjustable over a wide range of voltages and provides automatic indication of voltage deviation about preset limits.

The primary object of this invention is to provide a voltage deviation detector which will give instantaneous indication of any voltage deviation above or below the desired limits preset by the controls.

Another object of this invention is to provide a voltage deviation detector which is adjustable to provide for detection and/or limitation of voltage within a very narrow range, virtually a fixed value to a very wide range of tolerances, with sharp on and off characteristics or sensitivity.

Still another object of this invention is to provide a voltage deviation detector which may be used with D.C. voltage, or with A.C. voltage over a wide frequency range.

A further object of this invention is to provide a voltage deviation detector which can be built from standard components, no special or precision parts being necessary.

Finally, it is an object to provide a voltage deviation detector of the aforementioned character which is simple and convenient to operate and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which the single figure is a schematic wiring diagram of the voltage deviation detector.

The circuit includes an amplifier stage 10 having an A.C. input 12 for the voltage to be analyzed, which is connected to the grid of an amplifier tube 14, the plate of said tube being connected to a source of regulated power 16. The amplifier tube 14 amplifies the input voltage and this is fed to a cathode follower tube 18, the two preferably being portions of a single dual purpose tube for simplicity. The complete circuitry of the simple amplifier stage 10 is conventional and need not be discussed in detail. The output of the amplifier stage 10 is fed through a capacitor 20 to a pair of diodes 22 and 24 interconnected by a further capacitor 26, said capacitors and diodes together comprising a voltage multiplier-rectifier circuit generally indicated by the numeral 28.

The deviation detection portion of the circuit comprises a pair of blocking oscillators 30 and 130, the blocking oscillators being similar and including transformers 32 and 132, respectively, which are connected to the output of the multiplier-rectifier circuit 28, a resistor 34 being connected across the transformer inputs. The transformers 32 and 132 are connected at one side to the anodes of diodes 36 and 136, and at the other side to the cathodes of blocking oscillator tubes 38 and 138, the cathodes of said diodes being connected to the grids of said blocking oscillator tubes through capacitors 40 and 140. Thus the transformers 32 and 132 provide feedback paths for the blocking oscillator tubes 38 and 138 respectively, which may be portions of a dual purpose tube as indicated. The plates of blocking oscillator tubes 38 and 138 are provided with voltage from the regulated power source 16 through resistors 42 and 142, the grids of said tubes being connected to the same power source through resistors 44 and 144. The leads from transformers 32 and 132 to the cathodes of tubes 38 and 138 are also continued, through resistors 46 and 146, to one pair of contacts 48 and 148, respectively, of a relay 50. The detector is adjusted by means of a tolerance control unit 52 containing a pair of ganged variable resistors 54 and 154, which are coupled at one end to the regulated power source 16, their other ends being grounded. A positive bias voltage is fed from the sliding contacts 56 and 156 of the variable resistors 54 and 154 to the cathodes of diodes 36 and 136, which are further connected to ground, said variable resistors being reversed relative to each other so that one decreases resistance while the other increases, in direct proportion.

The relay 50 has a further pair of contacts 60 and 160 with a moving arm 62, the three connections therefrom leading to an on-off or two position indicator 64. The moving arm 66 for the relay contacts 48 and 148 connects hysteresis control resistors 46 and 146 to the circuit. Indicator 64 may be a lamp, bell, or similar device for indicating an abnormal condition, or may even be coupled to a suitable mechanism for automatically correcting an abnormal condition.

In operation, the A.C. voltage is amplified and rectified through the amplifier stage 10 and voltage multiplier-rectifier 28, the resultant voltage being fed into the blocking oscillators 30 and 130. With a positive bias voltage applied to the cathodes of diodes 36 and 136, conduction is impossible until a positive potential sufficient to overcome this bias is applied to the anodes of said diodes. With the diodes 36 and 136 in a non-conducting condition, there is no feedback path for the blocking oscillator tubes 38 and 138, which are thus quiescent and drawing a similar amount of plate current. The voltage drop across the resistors 42 and 142 is thus substantially equal and no current flows through the relay 50, which remains in open position. If the bias on the cathodes of diodes 36 and 136 is equal, the voltage at which they are non-conducting is virtually at a fixed point and any infinitesimal voltage change on their anodes will cause one or the other to conduct. This condition is critical and represents the minimum tolerance for which the detector may be set, as will hereinafter be apparent.

The bias to the cathodes of diodes 36 and 136 may be varied by adjusting the ganged variable resistors 54 and 154, so that one diode receives more bias than the other. The diode receiving the least bias now controls the low limit of tolerance of the A.C. input, while the diode receiving more bias controls the upper limit of tolerance. As soon as the A.C. voltage reaches a potential sufficient to overcome the bias on the diode 36, that diode will conduct, completing the feedback path and causing the blocking oscillator tube 38 to oscillate. This upsets the balanced condition across the resistors 42 and 142 and causes current to flow through the relay 50, actuating the relay and causing the moving arm 66 to engage the contact 148, as indicated in broken line. At the same time, the moving arm 62 completes the circuit with the contact 160 and actuates the indicator 64, which may be arranged to indicate a safe condition since the A.C. voltage is now within the required tolerance and is fed to ground through the now closed contact 148. As long as the A.C. voltage remains above the low tolerance, the diode 36 remains conductive and the tube 38 continues to oscillate, holding the indicator 64 at safe position.

If the A.C. voltage rises until the potential is sufficient to overcome the higher bias on the diode 136, that diode becomes conductive and allows the blocking oscillator tube 138 to oscillate. With both tubes 38 and 138 oscillating the balanced condition across resistors 42 and 142 is restored, stopping current flow through the relay 50 and causing the contacts to break. The relay 50 is now returned to its open position as shown in full line, the indicator 64 being arranged to show an unsafe or out of tolerance condition at this position of the relay. A similar condition exists when the A.C. voltage is below the required value and neither of the tubes 38 or 138 is oscillating, the relay 50 being in open position to cause an unsafe condition to register on the indicator 64. The resistors 46 and 146 are used to correct for hysteresis effect in the circuit so that the relay action is instantaneous when the A.C. voltage exceeds either tolerance limit. Without this correction, a slight delay would occur since the voltage would have to override the limits slightly before the circuit became reset.

The circuit is also suitable for controlling D.C. voltage, which is applied between the multiplier-rectifier and the blocking oscillators at the connection to the capacitor 26. This bypasses the rectification stage of the circuit which is not needed with the D.C. voltage, the remainder of the circuit and the operation thereof being as described above.

By means of the tolerance control unit 52, the upper and lower tolerance limits may be adjusted over a wide range and it has been found that the particular circuit shown is capable of a tolerance range of about .02% to 50% of the input voltage. The circuit is stable and accurate under various operating conditions such as temperature extremes. The indicator 64 may be audible or visual to provide immediate indication of voltage fluctuation to an observer, or may be coupled to a suitable mechanism or circuit to correct any voltage fluctuation which may occur.

It should be understood that the schematic wiring diagram represents one specific circuit for accomplishing the desired results using the paired blocking oscillators. The circuit may be transistorized and various other components may be substituted without materially affecting the function of the detector or departing from the scope of the invention.

The operation of this invention will be clearly comprehended from a consideration of the foregoing description of the mechanical details thereof, taken in connection with the drawing and the above recited objects. It will be obvious that all said objects are amply achieved by this invention.

I claim:

1. A voltage deviation detector, comprising: a pair of blocking oscillators; a relay operatively connected to said blocking oscillators to close when one of the oscillators is oscillating and to open when neither or both of the oscillators are oscillating; hysteresis control resistors connected between said blocking oscillators and said relay; an indicator connected to said relay to indicate the open and closed positions thereof; a source of positive bias voltage connected to said blocking oscillators to prevent oscillation therein; a positive input for the voltage to be analyzed and connected to said blocking oscillators in opposition to said source of bias voltage; and control means for selectively increasing the bias on one and simultaneously proportionally decreasing the bias on the other of said blocking oscillators, thereby establishing high and low limits about a predetermined bias potential, and whereby a potential of positive input voltage proportional to the bias on one or the other of said blocking oscillators overcomes the bias causing the particular oscillators to oscillate and actuate said relay.

2. A voltage deviation detector, comprising: a pair of blocking oscillators; each of said oscillators having a diode in series with the oscillation circuit thereof, each diode having an anode and a cathode; a positive input for voltage to be analyzed and connected to the anodes of said diodes; a grounded source of regulated bias voltage having its positive connected to the cathodes of said diodes such that the bias renders said diodes non-conductive and prevents oscillation in the circuits; control means connected between said diodes and said source and resistance coupled to ground for selectively increasing the bias on one of said diodes and simultaneously proportionally decreasing the bias on the other of said diodes, thereby establishing high and low limits about a predetermined bias potential, and whereby a potential of input voltage proportional to the bias voltage on one of said diodes overcomes the bias causing the oscillator associated therewith to oscillate; a relay operatively connected to said blocking oscillators to close when one of the oscillators is oscillating and to open when neither or both of the oscillators are oscillating; hysteresis control resistors connected between said blocking oscillators and said relay; and an indicator connected to said relay to indicate the open and closed positions thereof.

References Cited in the file of this patent
UNITED STATES PATENTS
2,678,418     Black _____ May 11, 1954

OTHER REFERENCES

Publication I—Wave Forms (Chance et al.) published by McGraw-Hill (New York) 1949 (page 343 relied on).

Publication II—Electronic and Radio Engineering (Terman) 4th ed., published by McGraw-Hill (1955) (pages 618 and 621 relied on).